US008812016B2

(12) United States Patent
Mallick et al.

(10) Patent No.: US 8,812,016 B2
(45) Date of Patent: Aug. 19, 2014

(54) METHOD AND SYSTEM OF DETERMINING POSITION INFORMATION OF USER EQUIPMENT IN A WIRELESS COMMUNICATION ENVIRONMENT

(75) Inventors: Prateek Basu Mallick, Bangalore (IN); Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 444 days.

(21) Appl. No.: 13/028,398

(22) Filed: Feb. 16, 2011

(65) Prior Publication Data

US 2011/0201352 A1 Aug. 18, 2011

(30) Foreign Application Priority Data

Feb. 16, 2010 (IN) ........................ 395/CHE/2010 PS
Feb. 15, 2011 (IN) ........................ 395/CHE/2010 CS

(51) Int. Cl.
*H04W 24/00* (2009.01)
(52) U.S. Cl.
USPC ................ 455/456.1; 455/432.1; 455/435.1; 455/456.2
(58) Field of Classification Search
USPC ........... 455/456.1, 456.2, 456.3, 432.1, 435.1
See application file for complete search history.

(56) References Cited

U.S. PATENT DOCUMENTS

| 8,081,986 B2* | 12/2011 | Park et al. ................. 455/456.1 |
| 2005/0003806 A1* | 1/2005 | Bazin et al. ................ 455/414.2 |
| 2005/0255857 A1* | 11/2005 | Kim et al. .................. 455/456.1 |
| 2006/0225090 A1* | 10/2006 | Shim et al. ...................... 725/25 |
| 2006/0258371 A1* | 11/2006 | Krishnamurthi et al. .. 455/456.1 |
| 2007/0286212 A1* | 12/2007 | Kim et al. ...................... 370/398 |
| 2009/0047951 A1* | 2/2009 | Yeoum et al. .............. 455/435.1 |
| 2009/0216846 A1* | 8/2009 | Burroughs et al. ........... 709/206 |

* cited by examiner

*Primary Examiner* — Liton Miah
(74) *Attorney, Agent, or Firm* — Jefferson IP Law, LLP

(57) ABSTRACT

A method and system for obtaining position information of a User Equipment (UE) in a wireless communication environment is provided. The system includes a UE, a radio network wirelessly coupled to the UE, and a core network wirelessly coupled to the radio network and having a positioning server and a core network element. The UE generates a request to initiate a positioning session including a temporary session identifier from the UE. The core network element allocates a permanent session identifier for the positioning session upon receiving the request with the temporary session identifier and communicates the permanent session identifier and the temporary session identifier to the UE. Moreover, the positioning server receives transaction data from the UE during the positioning session associated with the permanent session identifier and estimates a geographic location and velocity information associated with the UE based on the received transaction data.

23 Claims, 2 Drawing Sheets

METHOD AND SYSTEM OF DETERMINING POSITION INFORMATION OF USER EQUIPMENT IN A WIRELESS COMMUNICATION ENVIRONMENT

PRIORITY

This application claims the benefit under 35 U.S.C. §119 (a) of an India Provisional application filed on Feb. 16, 2010 in the Indian Intellectual Property Office and assigned Ser. No. 395/CHE/2010(PS), and an India Non-provisional application filed on Feb. 15, 2011 in the Indian Intellectual Property Office, and assigned Ser. No. 395/CHE/2010(CS), the entire disclosures of each of which are hereby incorporated by reference.

BACKGROUND OF THE INVENTION

1. Field of the Invention

The present invention relates to wireless communication. More particularly, the present invention relates to detecting the position of a user equipment in a wireless communication environment.

2. Description of the Related Art

Wireless communication networks generally allow for voice and/or wireless data communications between user equipments, pagers or data terminals that communicate using RF signals. In recent years, a number of location-based service systems have been implemented or proposed for wireless networks. Such systems generally involve determining positioning information for user equipments and processing the positioning information to provide an output desired for a particular application. Furthermore, recent advances in wireless data communications have made possible the utilization of User Equipments (UEs) to access information and/or services available on data networks, such as the Internet and the associated World Wide Web.

Accordingly, a number of data network location-based services, which utilize the position of a UE, are currently in operation to provide localized information for a requesting UE. Some of these systems are managed by wireless network providers to offer location-based services to their customers. In such systems, a positioning session is initiated between a UE and a positioning server (e.g., SLMC in UMTS, and eSLMC in LTE) to obtain required transaction data from the UE. These transaction data form a basis to estimate geographic location and velocity of the UE. The above systems determine position of the customers UE based on time of arrival (TOA), OTDOA, or E-OTD methods. The wireless network provider may utilize the position information to provide location specific information to the customer or other destination, or the position information may be provided to an external location-based service provider who provides location specific information, which is forwarded to the customer or other destination. Several such positioning sessions may be initiated and ongoing at a single point of time with various or same positioning servers. However, all the positioning sessions may appear as the same positioning session as they are not uniquely identified and hence a process of tracking transactions, such as capabilities updates, assistance data & measurement/location reports, etc., with respect to each of the positioning sessions may become cumbersome.

For MT/NI location request, existing systems identify a positioning session between an MME and an eSLMC using a unique identifier. The same session identifier can be used as the session identifier between the eSLMC and the UE. For a mobile originated location request, the UE may autonomously allocate a session ID to the positioning session during initiation of a mobile originated location request. However, different UEs may allocate separate identifiers to a positioning session with the same MME/eSLMC, leading to collision across different session identifiers associated with the positioning session.

SUMMARY OF THE INVENTION

An aspect of the present invention is to address at least the above-mentioned problems and/or disadvantages and to provide at least the advantages described below. Accordingly, an aspect of the present invention is to provide a method and system for obtaining position information of user equipment in a wireless communication environment.

In accordance with an aspect of the present invention, a method of providing position information of a User Equipment (UE) to a core network in a wireless communication environment is provided. The method includes generating a request to initiate a positioning session with a temporary session identifier associated with the positioning session, and communicating the request to initiate the positioning session including the temporary session identifier to a core network element associated with the core network. The method also includes receiving a message with a permanent session identifier and the temporary session identifier from the core network element in response to the request to initiate the positioning session, where the permanent session identifier is a unique session identifier allocated by the core network element for the positioning session with the UE.

The method may also include reporting transaction data to a positioning server of the core network using the permanent session identifier during the positioning session via a radio network. Moreover, the method may further include ending the reporting of the transaction data to the positioning server of the core network during the positioning session when the desired position information is provided to the positioning server.

In another aspect, a non-transitory computer-readable storage medium is provided having instructions stored therein, that, when executed by a user equipment, cause the user equipment to perform a method described above.

In accordance with yet another aspect of the present invention, a method of obtaining position information of a UE by a core network in a wireless communication environment is provided. The method includes receiving a request to initiate a positioning session including a temporary session identifier from the UE. The method also includes allocating a permanent session identifier for the positioning session corresponding to the temporary session identifier, and communicating the permanent session identifier and the temporary session identifier to the UE in response to the request to initiate the positioning session. Furthermore, the method includes receiving transaction data by a positioning server of the core network from the UE during the positioning session associated with the permanent session identifier. Additionally, the method may include estimating a geographic location and velocity information associated with the UE based on the transaction data received from the UE.

Also, the method may include sending a message indicating the end of the positioning session with the UE associated with the positioning session identifier, and stopping the receiving of transaction data from the UE based on the message indicating the end of the positioning session. Moreover, the method may include receiving an indication of a change of cell by the UE, and re-transmitting one or more messages associated with transaction data of the positioning information to the UE based on the indication of the change of cell.

In further another aspect, a non-transitory computer-readable storage medium is provided having instructions stored therein, that, when executed by elements of core network, result in performing a method described above.

In accordance with yet a further aspect of the present invention, a wireless communication system is provided. The system includes a UE, a radio network wirelessly coupled to the UE, and a core network wirelessly coupled to the radio network and having a positioning server and a core network element. The UE generates a request to initiate a positioning session including a temporary session identifier from the UE. The core network element allocates a permanent session identifier for the positioning session upon receiving the request with the temporary session identifier and communicates the permanent session identifier and the temporary session identifier to the UE. Moreover, the positioning server receives transaction data from the UE during the positioning session associated with the permanent session identifier and estimates a geographic location and velocity information associated with the UE based on the received transaction data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
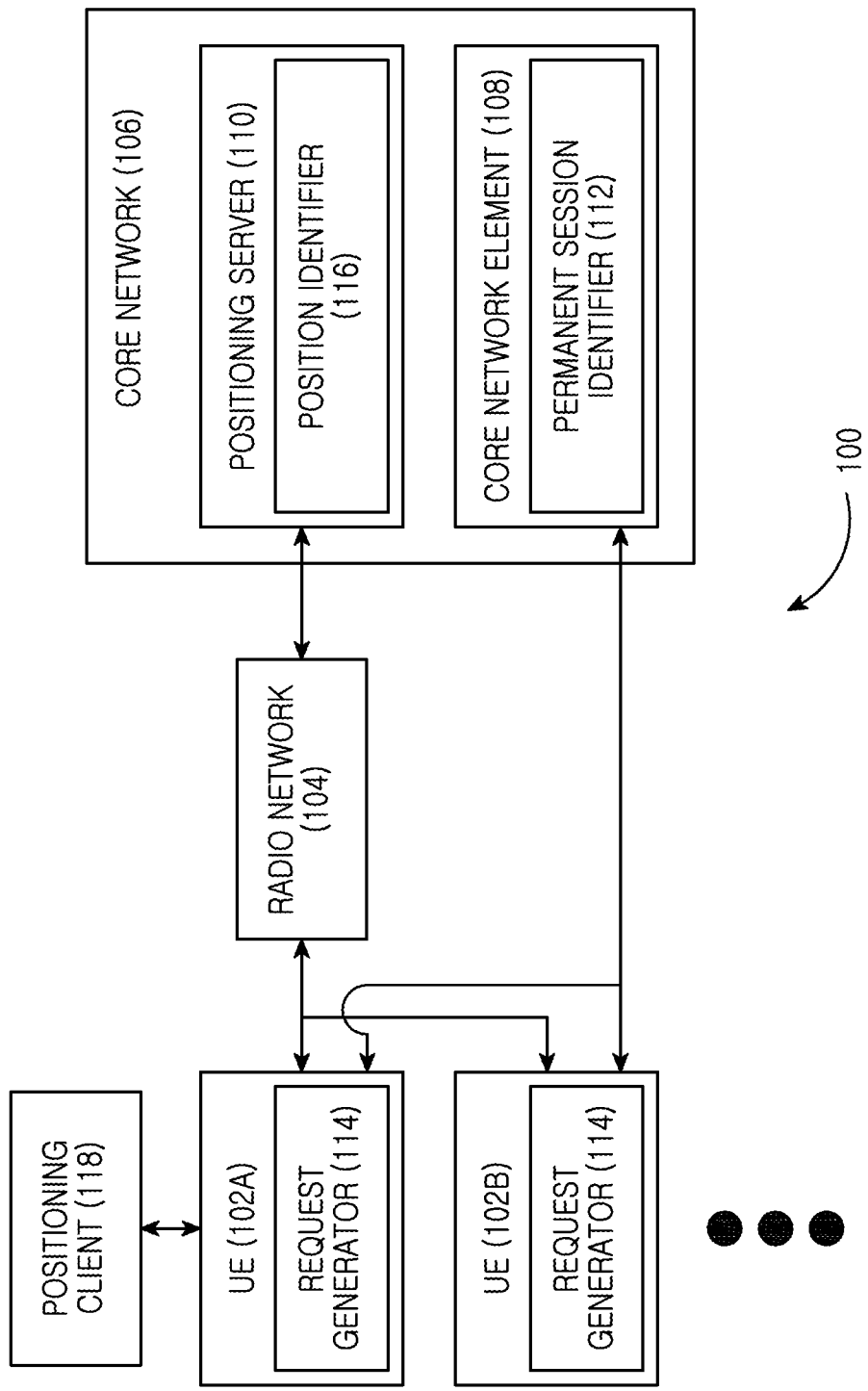
FIG. 1 is a block diagram of a wireless communication system for determining position information of a User Equipment (UE) according to an exemplary embodiment of the present invention.

FIG. 1 is a block diagram of a wireless communication system 100 for determining position information of a User Equipment (UE) according to an exemplary embodiment of the present invention.

Referring to FIG. 1, the wireless communication system 100 includes one or more UEs 102A-N, a radio network 104, a core network 106, and a positioning client 118. The core network 106 includes a core network element 108 having a permanent session ID module 112, and a positioning server 110 having a position identifier 116. The one or more UEs 102A-N are wirelessly coupled to the radio network 104 and the core network element 108. Also, the positioning server 110 is wirelessly coupled to the radio network 104. For example, the wireless communication system 100 may be a LTE based communication system or a UMTS based communication system.

As an example, the positioning client 118 may wish to determine position information associated with the UE 102A. In such case, the UE 102A generates a request to initiate a positioning session with a temporary session identifier and forwards the request with the temporary session identifier to the core network element 108. In an exemplary embodiment, the UE 102A may include a request generator 114 for generating and forwarding the request with the temporary identifier.

The permanent session ID module 112 in the core network element 108 allocates a permanent session identifier for the positioning session with the UE 102A upon receiving the request with the temporary session identifier. Then, the core network element 108 communicates the permanent session identifier along with the temporary session identifier to the UE 102A. Also, the core network element 108 sends the permanent session identifier to the positioning server 110. Based on the permanent session identifier, the positioning session is established between the positioning server 110 and the UE 102A via the radio network 104.

During the positioning session, the UE 102A periodically reports transaction data to the positioning server 110 using the permanent session identifier. For example, the transaction data includes positioning information associated with the UE 102A, capability updates, assistance information requests, measurement data and so on. Accordingly, the position identifier 116 estimates the geographic location and the velocity of the UE 102A based on the positioning information. Additionally, the positioning server 110 sends a location response message indicating the geographic location and velocity to the UE 102A in response to the transaction data.

Once, the desired positioning information is obtained from the UE 102A. The positioning server 110 may indicate the end of the positioning session to the UE 102 in a message. The positioning server 110 may set a positioning session status flag as true in a message which implies that no more transaction data are required by the positioning server 110. The UE 102A, upon receiving the message with the positioning session status flag, may determine whether the positioning session status flag indicates the end of the positioning session. Accordingly, the UE 102A stops reporting further transaction data to the positioning server 110, thereby ending the positioning session with the positioning server 110.

Further, when a delivery failure of any of previously transmitted messages (e.g., assistance information request, capability request, positioning information request, etc.) is suspected (e.g., upon change of a physical cell by the UE 102A is indicated by the core network element 108 or the UE 102A), the positioning server 110 would not be sure if the messages which were last sent by it were received successfully by the UE 102A and therefore it re-transmits the location response messages associated with the measurements of the positioning information to the UE 102A immediately after the physical cell is changed.

Figure 2:
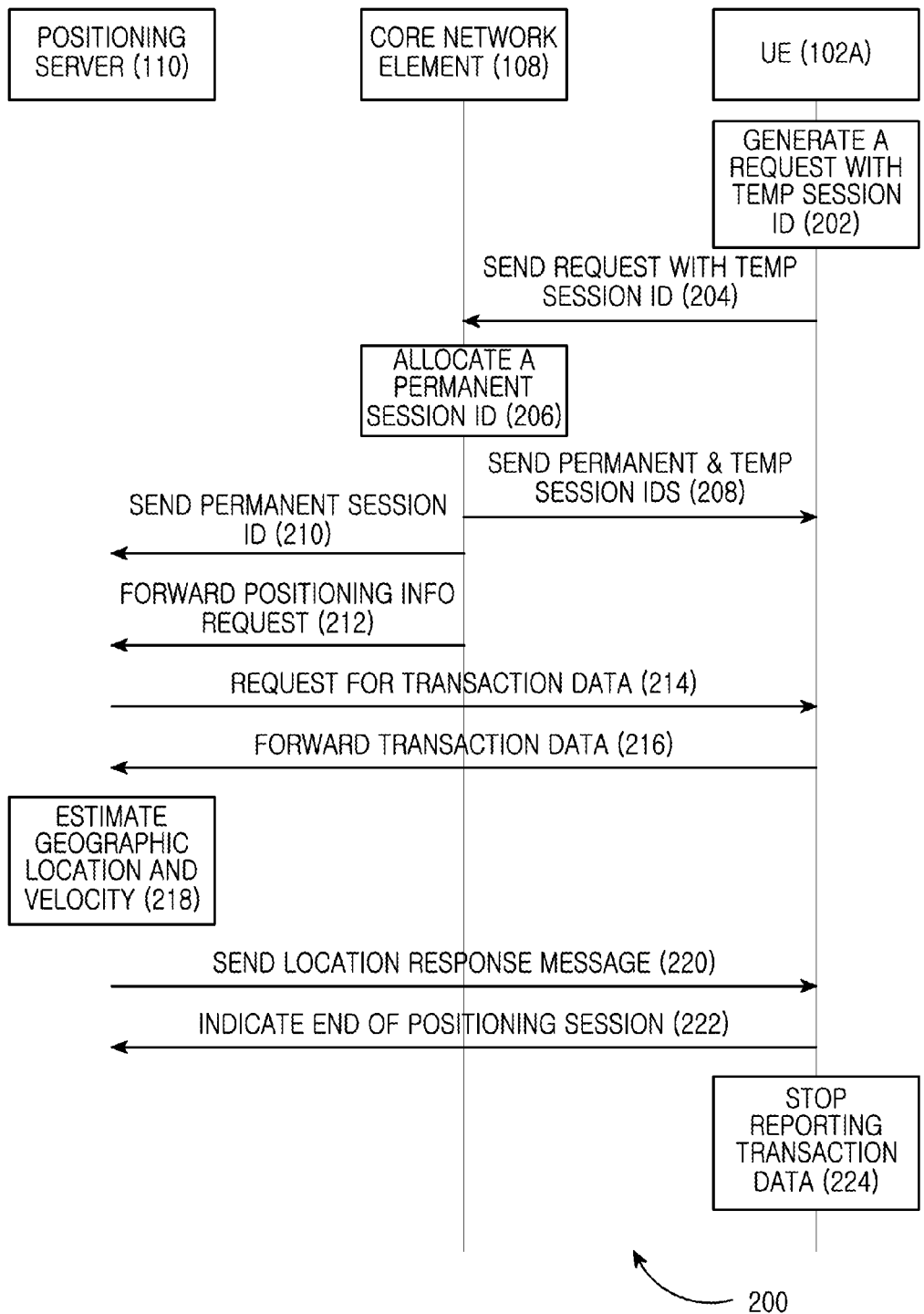
FIG. 2 illustrates a flow diagram for determining position information of a UE in a wireless communication environment, according to an exemplary embodiment of the present invention.

FIG. 2 illustrates a flow diagram for determining position information of a UE in a wireless communication environment according to an exemplary embodiment of the present invention.

Referring to FIG. 2, at step 202, the UE 102A generates a request to initiate a positioning session with a temporary session identifier. At step 204, the UE 102A forwards the request with the temporary session identifier to the core network element 108. At step 206, the core network element 108 allocates a permanent session identifier for the positioning session in response to the request with the temporary session identifier. At step 208, the core network element 108 sends a message including the permanent session identifier and the corresponding temporary identifier to the UE 102A. At step 210, the core network element 108 communicates the permanent session identifier associated with the positioning session to the positioning server 110.

At step 212, the core network element 108 forwards the request for positioning information to the positioning server 110. At step 214, the positioning server 110 requests the UE 102A to provide transaction data associated with the positioning information. At step 216, the UE 102A forwards transaction data to the positioning server 110. At step 218, the positioning server 110 estimates a geographic location and velocity of the UE 102A based on the transaction data. At step 220, the positioning server 110 communicates a location response message having the geographic location and velocity of the UE 102A to the UE 102A via the core network element 108. At step 222, the positioning server 110 indicates the end of the positioning session when the desired positioning information is obtained. At step 224, the UE stops forwarding transaction data to the positioning server 110. In one exemplary implementation, the positioning server 110 may indicate the end of the positioning session via a positioning session status flag in the location response message or a new message.

Moreover, a non-transitory computer-readable storage medium may be provided having instructions stored therein, that, when executed by the components of the wireless communication system, result in performing the method of FIG. 2. One can envision that the messages can be exchanged between the UEs 102A-N and the positioning server 110 using a Non-Access-Stratum (NAS) protocol, LTE Positioning Protocol (LPP) or other known protocols. Also, in an LTE based communication system, the positioning server 110 refers to an eSLMC and the core network element 108 refers to an MME.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing position information of a User Equipment (UE) to a core network in a wireless communication environment, the method comprising:
   in response to a request for positioning information for the UE, generating a temporary session identifier;
   generating a request to initiate a positioning session with the temporary session identifier associated with the positioning session;
   communicating the request to initiate the positioning session including the temporary session identifier to a core network element associated with the core network;
   receiving a message with a permanent session identifier and the temporary session identifier from the core network element in response to the request to initiate the positioning session, wherein the permanent session identifier is a unique session identifier allocated by the core network element for the positioning session with the UE; and
   reporting transaction data to a positioning server of the core network using the permanent session identifier during the positioning session via a radio network.

2. The method of claim 1, wherein the transaction data comprises positioning information, capability information, measurement data, and assistance information.

3. The method of claim 1, further comprising:
   finishing the reporting of the transaction data to the positioning server of the core network during the positioning session when the desired position information is provided to the positioning server.

4. The method of claim 3, wherein the finishing of the reporting of the transaction data to the positioning server of the core network during the positioning session comprises:
   receiving a message including a positioning session status flag from the positioning server;
   determining whether the positioning session status flag indicates the end of the positioning session;
   if it is determined that the positioning session status flag indicates the end of the positioning session, finishing the reporting of the transaction data to the positioning server of the core network during the positioning session; and
   if it is determined that the positioning session status flag does not indicate the end of the positioning session, continuing the reporting of the transaction data to the positioning server of the core network during the positioning session.

5. A non-transitory computer-readable storage medium having instructions stored therein, that, when executed by User Equipment (UE), cause the UE to perform a method of providing position information of the UE to a core network in a wireless communication environment, the storage medium comprising:
   in response to a request for positioning information for the UE, generating a temporary session identifier;
   generating a request to initiate a positioning session with the temporary session identifier associated with the positioning session;
   communicating the request to initiate the positioning session including the temporary session identifier to a core network element associated with the core network;
   receiving a message with a permanent session identifier and the temporary session identifier from the core network element in response to the request to initiate the positioning session, wherein the permanent session identifier is a unique session identifier allocated by the core network element for the positioning session with the UE; and reporting transaction data to a positioning server of the core network using the permanent session identifier via a radio network during the positioning session.

6. The storage medium of claim 5, wherein the transaction data comprises information, capability information, measurement data, and assistance information.

7. The storage medium of claim 5, wherein the method further comprises:
    finishing the reporting of the transaction data to the positioning server of the core network during the positioning session when the desired position information is provided to the positioning server.

8. The storage medium of claim 7, wherein the instruction to finish the reporting of the transaction data to the positioning server of the core network during the positioning session comprises:
    receiving a message including a positioning session status flag from the positioning server;
    determining whether the positioning session status flag indicates the end of the positioning session;
    if it is determined that the positioning session status flag indicates the end of the positioning session, finishing the reporting of the transaction data to the positioning server of the core network during the positioning session; and
    if it is determined that the positioning session status flag does not indicate the end of the positioning session, continuing the reporting of the transaction data to the positioning server of the core network during the positioning session.

9. A method of obtaining position information of a User Equipment (UE) by a core network in a wireless communication environment, the method comprising:
    receiving a request to initiate a positioning session including a temporary session identifier from the UE;
    allocating a permanent session identifier for the positioning session corresponding to the temporary session identifier;
    communicating the permanent session identifier and the temporary session identifier to the UE in response to the request to initiate the positioning session; and
    receiving transaction data by a positioning server of the core network from the UE during the positioning session associated with the permanent session identifier,
    wherein the temporary session identifier is generated in response to a request for positioning information at the UE.

10. The method of claim 9, further comprising:
    estimating a geographic location and velocity information associated with the UE based on the transaction data received from the UE.

11. The method of claim 9, wherein the transaction data comprises positioning information, capability information, measurement data, and assistance information.

12. The method of claim 9, further comprising:
    sending a message indicating the end of the positioning session with the UE associated with the positioning session identifier; and
    stopping the receiving of the transaction data from the UE based on the message indicating the end of the positioning session.

13. The method of claim 12, further comprising:
    receiving an indication of a change of cell by the UE;
    re-transmitting one or more messages associated with transaction data of the positioning information to the UE based on the indication of the change of cell.

14. A non-transitory computer-readable storage medium having instructions stored therein, that, when executed by network entities in a core network, result in performing a method of obtaining position information of a User Equipment (UE) to a core network in a wireless communication environment, the method comprising:
    receiving a request to initiate a positioning session including a temporary session identifier from the UE;
    allocating a permanent session identifier for the positioning session corresponding to the temporary session identifier;
    communicating the permanent session identifier and the temporary session identifier to the UE in response to the request to initiate the positioning session; and
    receiving transaction data by a positioning server of the core network from the UE during the positioning session associated with the permanent session identifier,
    wherein the temporary session identifier is generated in response to a request for positioning information at the UE.

15. The storage medium of claim 14, wherein the method further comprises:
    estimating a geographic location and velocity information associated with the UE based on the transaction data received from the UE.

16. The storage medium of claim 14, wherein the transaction data comprises positioning information, capability information, measurement data, and assistance information.

17. The storage medium of claim 14, wherein the method further comprises:
    sending a message indicating the end of the positioning session with the UE associated with the positioning session identifier; and
    stopping the receiving of the transaction data from the UE based on the message indicating the end of the positioning session.

18. The storage medium of claim 17, wherein the method further comprises:
    receiving an indication of a change of cell by the UE;
    re-transmitting one or more messages associated with transaction data of the positioning information to the UE based on the indication of the change of cell.

19. A wireless communication system, the system comprising:
    at least one User Equipment (UE);
    a radio network wirelessly coupled to the at least one UE; and
    a core network wirelessly coupled to the radio network, wherein the core network comprises a positioning server and a core network element,
    wherein the at least one UE generates a temporary session identifier in response to a request for positioning information and generates a request to initiate a positioning session including the temporary session identifier from the at least one UE,
    wherein the core network element allocates a permanent session identifier for the positioning session upon receiving the request with the temporary session identifier, and communicates the permanent session identifier and the temporary session identifier to the at least one UE, and
    wherein the positioning server receives transaction data from the at least one UE during the positioning session associated with the permanent session identifier.

20. The system of claim 19, wherein the positioning server estimates a geographic location and velocity information associated with the at least one UE based on the transaction data received from the at least one UE.

21. The system of claim 19, wherein the transaction data comprises positioning information, capability information, measurement data, and assistance information.

22. The system of claim 19, wherein the positioning server sends a message indicating the end of the positioning session with the user equipment associated with the positioning session identifier, and stops the receiving of the transaction data from the at least one UE based on the message indicating the end of the positioning session.

23. The system of claim 22, wherein the positioning server receives an indication of a change of cell by the at least one UE, and re-transmits one or more messages associated with measurement of the positioning information to the at least one UE based on the indication of the change of cell.

\* \* \* \* \*